United States Patent
Zhang et al.

(10) Patent No.: US 12,045,177 B2
(45) Date of Patent: Jul. 23, 2024

(54) DATA REPORT RATE ADJUSTMENT METHOD

(71) Applicant: Primax Electronics Ltd., Taipei (TW)

(72) Inventors: Shi-Jie Zhang, Taipei (TW); Che-Yen Huang, Taipei (TW); Ying-Che Tseng, Taipei (TW); Chien-Ming Ho, Taipei (TW); Chien-Nan Lin, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 499 days.

(21) Appl. No.: 17/544,886

(22) Filed: Dec. 7, 2021

(65) Prior Publication Data

US 2023/0117661 A1  Apr. 20, 2023

(30) Foreign Application Priority Data

Oct. 15, 2021  (TW) .................................. 110138419

(51) Int. Cl.
*G06F 13/16* (2006.01)
*G06F 1/3234* (2019.01)
*G06F 13/10* (2006.01)

(52) U.S. Cl.
CPC .......... *G06F 13/1605* (2013.01); *G06F 1/325* (2013.01); *G06F 13/10* (2013.01)

(58) Field of Classification Search
None
See application file for complete search history.

(56) References Cited

U.S. PATENT DOCUMENTS

2021/0373678 A1* 12/2021 Chauvin ............... G06F 3/0383

\* cited by examiner

*Primary Examiner* — Scott C Sun
(74) *Attorney, Agent, or Firm* — KIRTON McCONKIE; Evan R. Witt

(57) ABSTRACT

A data report rate adjustment method for use between a computer host and a peripheral device is provided. According to the actual workload level of the computer host and/or the amount of the input data of the peripheral device, the priority or the report rate of the data to be transmitted from the peripheral device can be dynamically adjusted or set. More especially, the unnecessary data report can be avoided. Consequently, the workload of the computer host can be effectively reduced, and the power consumption of the peripheral device can be saved.

12 Claims, 6 Drawing Sheets

# DATA REPORT RATE ADJUSTMENT METHOD

FIELD OF THE INVENTION

The present invention relates to a data report rate adjustment method, and more particularly to a data report rate adjustment method for use between a computer host and a peripheral device.

BACKGROUND OF THE INVENTION

In the information field, a data report rate is usually used to represent the speed or the frequency that a HID (human interface device) type peripheral device such as a mouse, a keyboard or a voice-controlled sound input device reports a data to a computer host. For example, if the data report rate of a HID-type peripheral device in a Windows operating system is 250 Hz, the HID-type peripheral device transfers 250 reports of data to the computer host every second. In other words, the computer host receives one data from the HID-type peripheral device very 4 ms on average.

At present, for professional computer gamers or computer creators, the easiest input peripheral device to be operated is the mouse. Nowadays, in order to improve the accuracy, the smoothness and the control feel of operating the mouse, the method of increasing the data report rate is usually adopted. For example, a mouse capable of reporting 10000 data per second has been introduced into the market. That is, the computer host receives one data every 100 μs on average. Under this circumstance, up to 10,000 interrupt notifications per second are generated.

Since the amount of data to be reported is tool huge and the data report rate is too high, some drawbacks occur. For example, if the hardware performance of the computer host is not good or the computer host is in a high load operation state, the workload of the computer host is further increased. Under this circumstance, the possibility that the computer host is unable to meet this requirement of high data report rate will increase. Moreover, it is a power-consuming work for the peripheral device to be operated at the high data report rate.

In order to overcome the drawbacks of the conventional technologies, there is a need of providing an intelligent or dynamic data report rate adjustment method for use between a computer host and a peripheral device.

SUMMARY OF THE INVENTION

An object of the present invention provides a data report rate adjustment method for use between a computer host and a peripheral device. The data report rate can be dynamically adjusted according to the actual workload level of the computer host and/or the amount of the input data of the peripheral device.

In accordance with an aspect of the present invention, a data report rate adjustment method for use between a computer host and a peripheral device is provided. The data report rate adjustment method includes the following steps. In a step (a), a hardware operation information is acquired. Then, a step (b) is performed to judge whether the hardware operation information reaches a monitoring threshold value. In a step (c), if the hardware operation information does not reach the monitoring threshold value, a data report rate of the peripheral device is maintained, and the step (a) is performed again. In a step (d), if the hardware operation information reaches the monitoring threshold value, a data report rate change command is issued to the peripheral device. The peripheral device performs a data report rate adjustment and transmission process in response to the data report rate change command, and the step (a) is performed again. During the data report rate adjustment and transmission process, the peripheral device dynamically changes the data report rate and/or dynamically determines a data transmission strategy according to the data report rate change command and a data report rate adjustment rule. While input data corresponding to a peripheral device input information are transmitted from the peripheral device to the computer host, the data report rate is dynamically adjusted according to a data type information or a data amount information in the peripheral device input information and/or the data transmission strategy is dynamically determined according to the data type information or the data amount information in the peripheral device input information.

In the step (a), the hardware operation information contains at least one of a hardware real-time load information and the peripheral device input information.

In an embodiment, the hardware real-time load information is related to a workload level of a central processing unit of the computer host in a real-time operation, and the peripheral device input information is related to a type or an amount of the input data to be transmitted from the peripheral device to the computer host.

In the step (b), the monitoring threshold value is a monitoring threshold value related to the workload level of the central processing unit of the computer host in the real-time operation, or the monitoring threshold value is a monitoring threshold value related to the type or the amount of the input data of the peripheral device.

In the step (d), the data type information in the peripheral device input information is related to at least one of a key data, a sensor data, a roller movement data and a light effect control data.

In the step (d), the data report rate adjustment rule is at least related to the data report rate corresponding to the data type information in the peripheral device input information. The data report rate corresponding to the key data is higher than the data report rate of each of the sensor data and the roller movement data, or the data report rate of each of the sensor data and the roller movement data is higher than the data report rate corresponding to the light effect control data.

In the step (d), the data report rate adjustment rule is at least related to the data transmission strategy corresponding to the data type information in the peripheral device input information. The key data has the highest priority to be transmitted from the peripheral device, each of the sensor data and the roller movement data has a lower priority to be transmitted from the peripheral device, and the light effect control data has the lowest priority to be transmitted from the peripheral device.

In the step (d), the data report rate adjustment rule is at least related to the data transmission strategy corresponding to the data amount information in the peripheral device input information. At least one of the sensor data, the roller movement data and the light effect control data is subjected to a specified removing and recombining process so as to reduce an overall data amount. Then, the at least one of the sensor data, the roller movement data and the light effect control data with the reduced data amount is transmitted from the peripheral device to the computer host.

In an embodiment, during the specified removing and recombining process, at least one small-sized data in the at least one of the sensor data, the roller movement data and the light effect control data is removed, or at least one of two shortly-generated consecutive data in the at least one of the sensor data, the roller movement data and the light effect control data are removed, or plural small-sized data in the at least one of the sensor data, the roller movement data and the light effect control data are removed, and the at least one of the sensor data, the roller movement data and the light effect control data are recombined.

In the step (d), before the peripheral device input information is transmitted from the peripheral device to the computer host, the input data corresponding to the peripheral device input information are integrated as a data package in a transmission format complying with the peripheral device by the peripheral device. After the data package is temporarily stored in the peripheral device, the data package is transmitted from the peripheral device to the computer host.

In an embodiment, before the step (d), the data report rate adjustment method at least includes the following steps. In a step (e), if the hardware operation information reaches the monitoring threshold value, judge whether the data report rate adjustment rule needs to be updated. If a judging result of the step (e) indicates that the data report rate adjustment rule needs to be updated, a step (f) is performed to allow the peripheral device to update the data report rate adjustment rule, and the step (d) is performed again.

In an embodiment, a data report rate intelligent adjustment software is installed in the computer host, and the data report rate intelligent adjustment software works with the computer host and a microprocessor of the peripheral device to implement the step (a), the step (b), the step (c), the step (d), the step (e) and the step (f). When the data report rate intelligent adjustment software is executed, an operation status or a system configuration status of the computer host and/or the peripheral device is detected and collected, so that the hardware operation information is acquired.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. In the following embodiments and drawings, the elements irrelevant to the concepts of the present invention are omitted and not shown.

Figure 1:
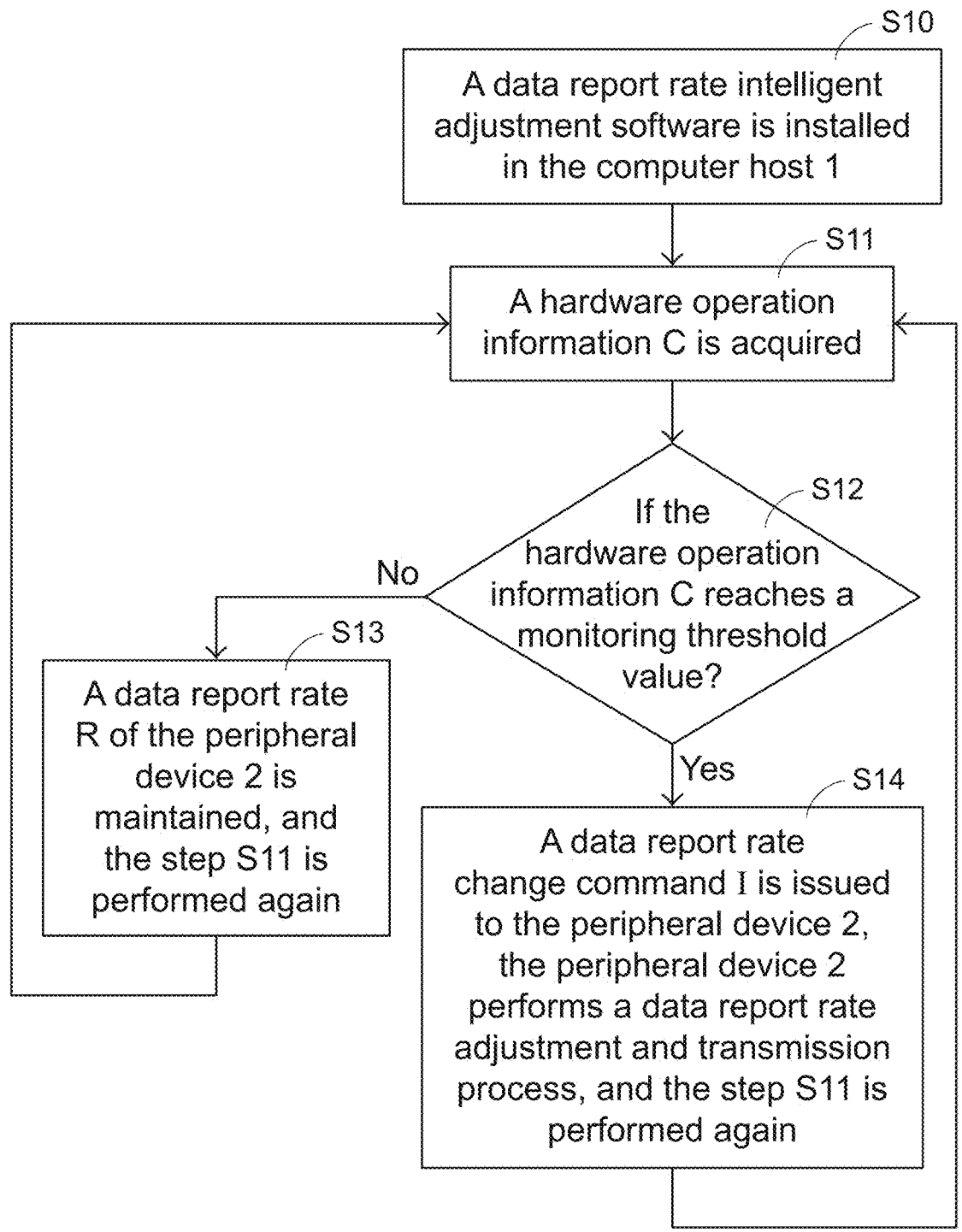
FIG. 1 illustrates a flowchart of a data report rate adjustment method according to a first embodiment of the present invention.
Figure 3A:
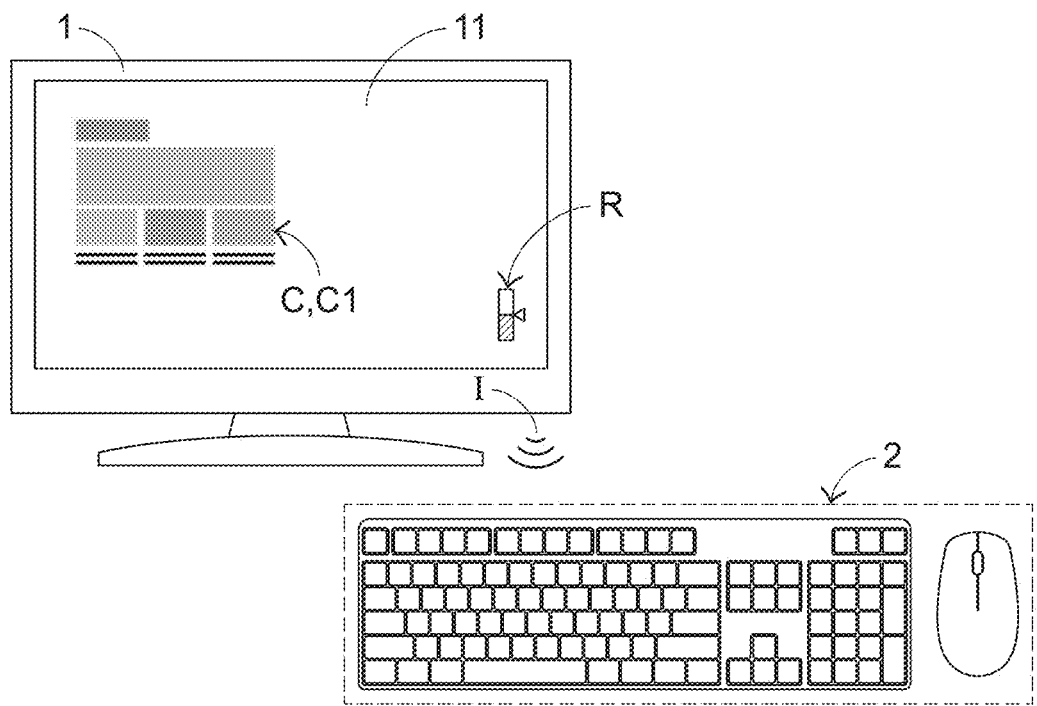
FIGS. 3A and 3B illustrate two implementation examples of using the data report rate adjustment method of the first embodiment and the second embodiment of the present invention.
Figure 3B:
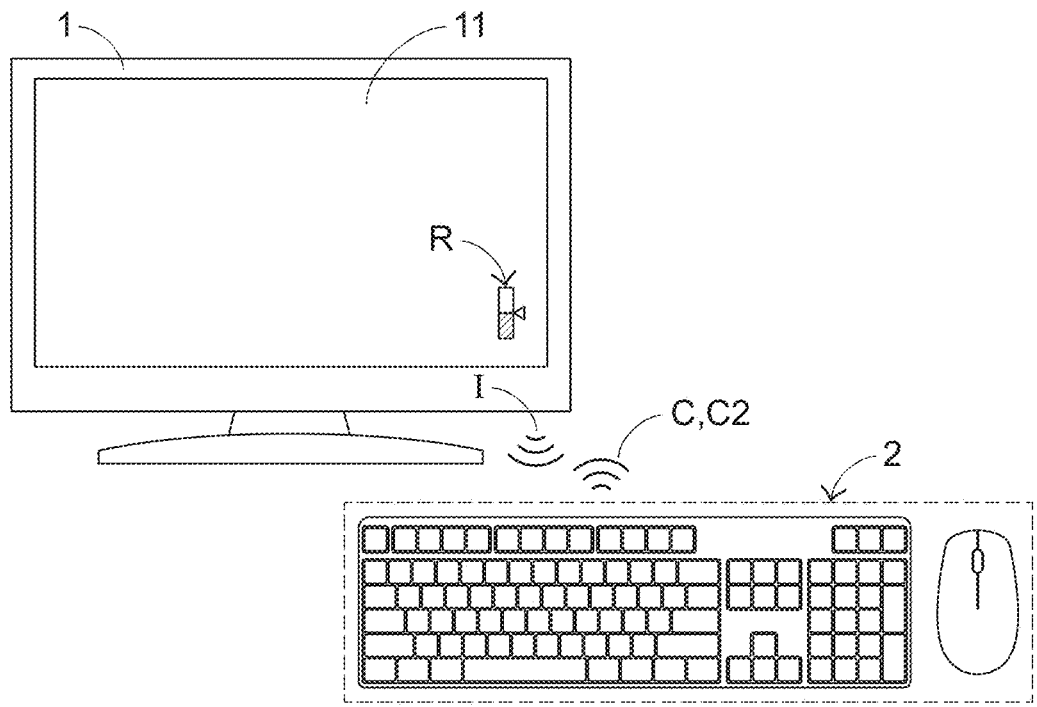

The present invention provides a data report rate adjustment method. For well understanding the concepts of the present invention, a flowchart of the data report rate adjustment method will be described as follows. FIG. 1 illustrates a flowchart of a data report rate adjustment method according to a first embodiment of the present invention. Two implementation examples of using the data report rate adjustment method between a computer host 1 and a peripheral device 2 according to the first embodiment will be illustrated with reference to FIGS. 3A and 3B.

The computer host 1 is a personal terminal computer device (e.g., a notebook computer, a desktop host, or any other appropriate handheld computer device) or a cloud computer device. The peripheral device 2 is a HID (human interface device) type peripheral device such as a mouse, a keyboard or a voice-controlled sound input device. For well understanding the present invention, a mouse and/or a keyboard will be taken as the example of the peripheral device. It is noted that the example of the peripheral device is not restricted.

The data report rate adjustment method according to the first embodiment of the present invention comprises the following steps.

Firstly, in a step S10, a data report rate intelligent adjustment software is installed in the computer host 1.

The data report rate intelligent adjustment software can work with the computer host 1 and a microprocessor of the peripheral device 2 to implement the concepts of the present invention.

In an embodiment, the data report rate intelligent adjustment software is built in the computer host 1. Alternatively, the data report rate intelligent adjustment software is sold with the peripheral device 2, and then the data report rate intelligent adjustment software is installed in the computer host 1 by the user.

In a step S11, a hardware operation information C is acquired.

When the data report rate intelligent adjustment software is executed, the operation status or the system configuration status of the computer host 1 and/or the peripheral device 2 can be detected and collected. Consequently, the hardware operation information C can be acquired. The hardware operation information C contains at least one of a hardware real-time load information C1 and a peripheral device input information C2. The hardware real-time load information C1 is related to a workload level of a central processing unit of the computer host 1 in the real-time operation. The peripheral device input information C2 is related to the type and the amount of an input data to be outputted from the peripheral device 2 to the computer host 1. In other words, the peripheral device input information contains a data type information and a data amount information.

Then, a step S12 is performed to judge whether the hardware operation information C reaches a monitoring threshold value.

In an embodiment, the data report rate intelligent adjustment software is responsible for judging and confirming whether the hardware operation information C reaches the monitoring threshold value.

If the judging result of the step S12 indicates that the hardware operation information C does not reach the monitoring threshold value, a step S13 is performed. In the step S13, a data report rate R of the peripheral device 2 is maintained, and the step S11 is performed again.

In an embodiment, the current data report rate R of the peripheral device 2 is shown on a display screen 11 of the computer host 1.

If the judging result of the step S12 indicates that the hardware operation information C reaches the monitoring threshold value, a step S14 is performed. In the step S14, a data report rate change command I is issued to the peripheral device 2. In response to the data report rate change command I, the peripheral device 2 performs a data report rate adjustment and transmission process, and then the step S11 is performed again.

During the data report rate adjustment and transmission process, the peripheral device 2 dynamically changes the data report rate and/or dynamically determines a data transmission strategy according to the data report rate change command I and a data report rate adjustment rule. For example, while the input data corresponding to the peripheral device input information C2 is transmitted from the peripheral device 2 to the computer host 1, the data report rate is dynamically adjusted according to the data type information or the data amount information in the peripheral device input information C2 and/or the data transmission strategy is dynamically determined according to the data type information or the data amount information in the peripheral device input information C2.

For further understanding the concepts of the present invention, a data report rate adjustment method according to a second embodiment of the present invention will be illustrated with reference to FIGS. 2A, 2B, 2C, 3A and 3B.

Figure 2A:
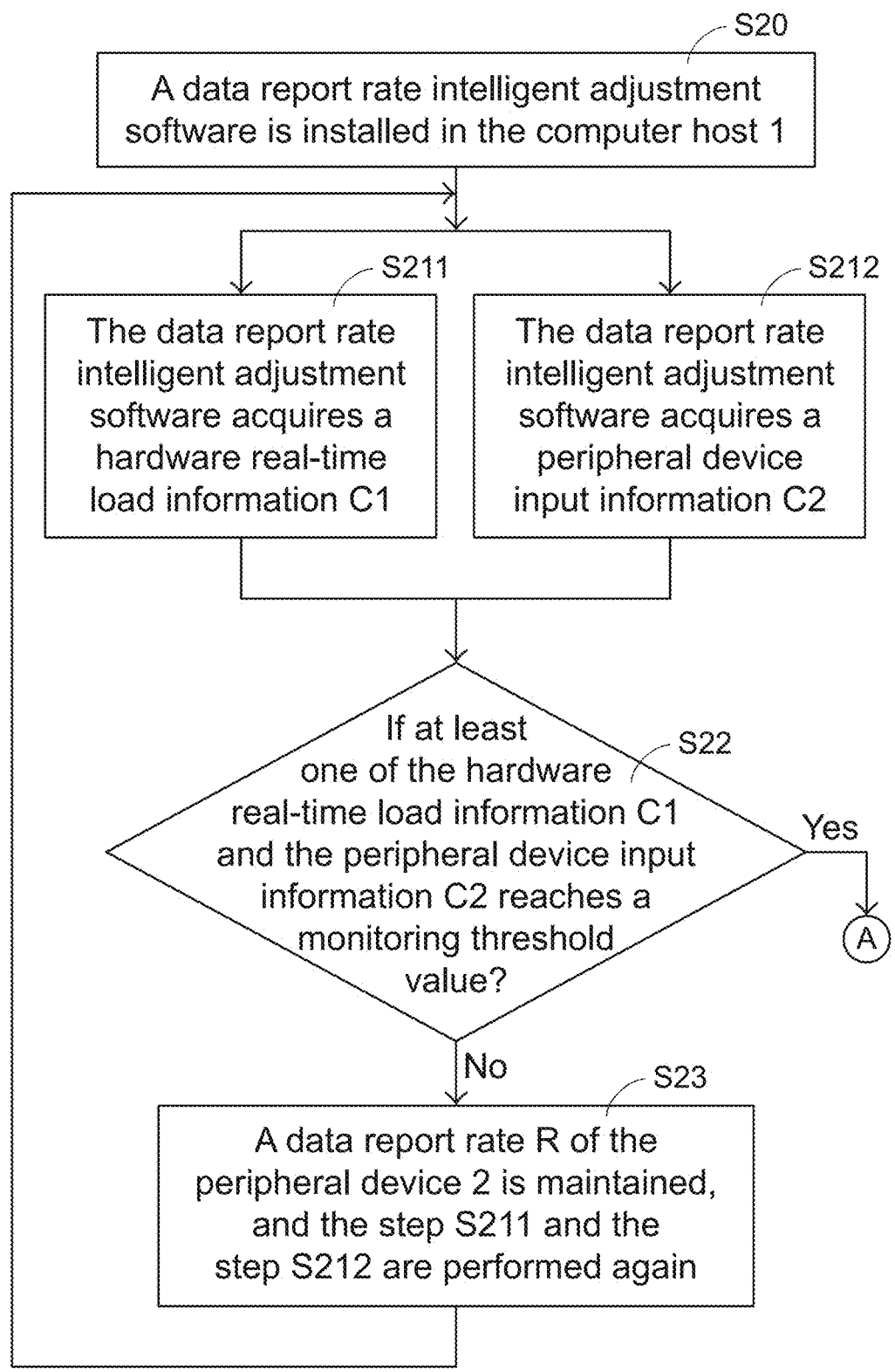
FIGS. 2A, 2B and 2C illustrate a flowchart of a data report rate adjustment method according to a second embodiment of the present invention.
Figure 2B:
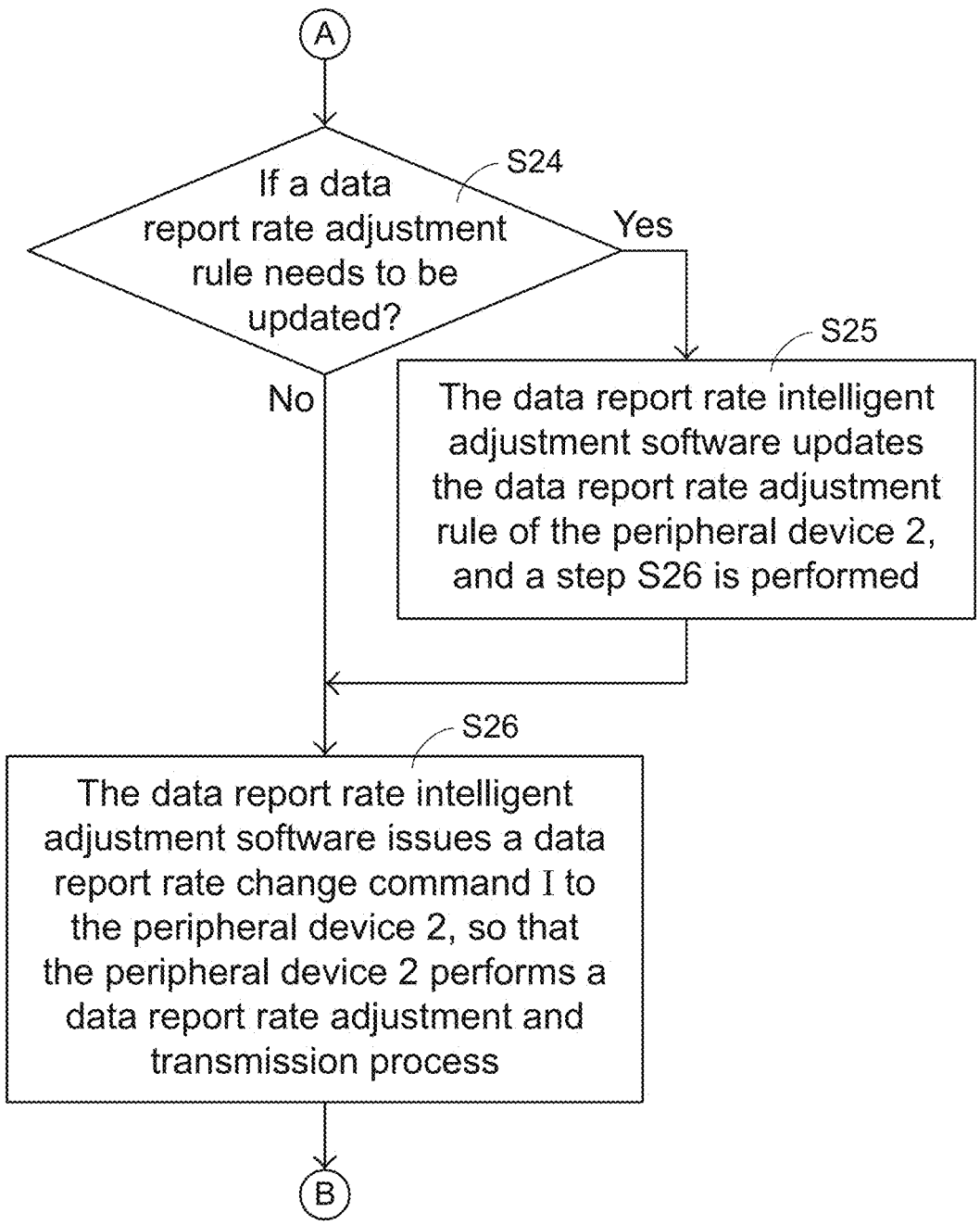
Figure 2C:
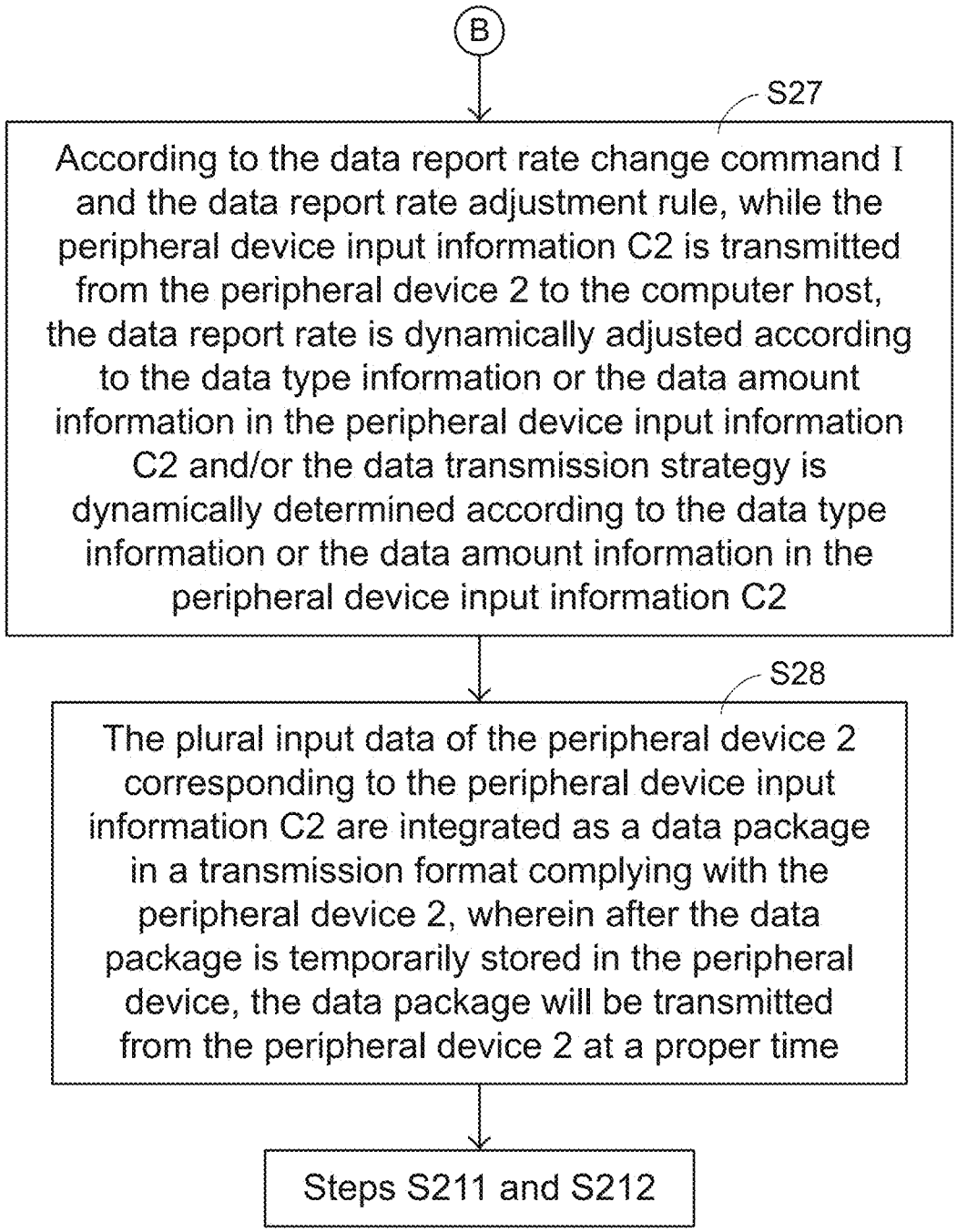

FIGS. 2A, 2B and 2C illustrate a flowchart of a data report rate adjustment method according to a second embodiment of the present invention. Two implementation examples of using the data report rate adjustment method between the computer host 1 and the peripheral device 2 according to the second embodiment will be illustrated with reference to FIGS. 3A and 3B.

The data report rate adjustment method according to the second embodiment of the present invention comprises the following steps.

Firstly, in a step S20, a data report rate intelligent adjustment software is installed in the computer host 1.

The data report rate intelligent adjustment software can work with the computer host 1 and a microprocessor of the peripheral device 2 to implement the concepts of the present invention.

In a step S211, the data report rate intelligent adjustment software acquires a hardware real-time load information C1.

In a step S212, the data report rate intelligent adjustment software acquires a peripheral device input information C2.

In the step S211 and the step S212, the data report rate intelligent adjustment software is executed to detect and collect the operation status or the system configuration status of the computer host 1 and the peripheral device 2. Consequently, the hardware real-time load information C1 and the peripheral device input information C2 are respectively acquired. The hardware real-time load information C1 is related to a workload level of a central processing unit of the computer host 1 in the real-time operation. The peripheral device input information C2 is related to the type and the amount of an input data to be outputted from the peripheral device 2 to the computer host 1. In other words, the peripheral device input information contains a data type information and a data amount information.

For example, in case that the peripheral device is a mouse, the data type information in the peripheral device input information C2 is related to at least one of a key data, a sensor data, a roller movement data, a light effect control data and any other appropriate input data. It is noted that the data type is not restricted.

After the step S211 or the step S212 is completed, a step S22 is performed to judge whether at least one of the hardware real-time load information C1 and the peripheral device input information C2 reaches a monitoring threshold value.

The monitoring threshold value is a monitoring threshold value related to a workload level of a central processing unit of the computer host 1 in the real-time operation, or the monitoring threshold value is a monitoring threshold value related to the amount of the input data of the peripheral device 2.

If the judging result of the step S22 indicates that both of the hardware real-time load information C1 and the peripheral device input information C2 do not reach the corresponding monitoring threshold values, a step S23 is performed. In the step S23, a data report rate R of the peripheral device 2 is maintained, and the step S211 and the step S212 are performed again.

If the judging result of the step S22 indicates that at least one of the hardware real-time load information C1 and the peripheral device input information C2 reaches the corresponding monitoring threshold value, a step S24 is performed. In the step S24, the data report rate intelligent adjustment software judges whether a data report rate adjustment rule needs to be updated.

If the judging result of the step S24 indicates that the data report rate adjustment rule needs to be updated, a step S25 is performed. In the step S25, the data report rate intelligent adjustment software updates the data report rate adjustment rule of the peripheral device 2, and a step S26 is performed.

Moreover, if at least one of the hardware real-time load information C1 and the peripheral device input information C2 reaches the corresponding monitoring threshold value and even the data report rate adjustment rule does not need to be updated, the step S26 is performed. In the step S26, the data report rate intelligent adjustment software issues a data report rate change command I to the peripheral device 2. In response to the data report rate change command I, the peripheral device 2 performs a data report rate adjustment and transmission process.

After the step S26 is completed, a step S27 is performed. In the step S27, the peripheral device 2 dynamically changes the data report rate and/or dynamically determines a data transmission strategy according to the data report rate change command I and the data report rate adjustment rule. For example, while the input data corresponding to the peripheral device input information C2 are transmitted from the peripheral device 2 to the computer host, the data report rate is dynamically adjusted according to the data type information or the data amount information in the peripheral device input information C2 and/or the data transmission strategy is dynamically determined according to the data type information or the data amount information in the peripheral device input information C2.

For example, the peripheral device is a mouse. In the step S24~S27, the data report rate adjustment rule is at least related to the data report rate corresponding to the data type information in the peripheral device input information C2. According to the settings, the data report rate corresponding to the key data is higher than the data report rate of each of the sensor data and the roller movement data, or the data report rate of each of the sensor data and the roller movement data is higher than the data report rate corresponding to the light effect control data. It is noted that the data report rates corresponding to different data types may be varied according to the practical requirements or dynamically adjusted. For example, the hardware real-time load information C1 may also be taken into consideration. That is, the data report rate adjustment rule is dynamically adjusted according to the peripheral device input information C2 and the hardware real-time load information C1.

In other words, a small amount of important data (e.g., the key data) can be transmitted from the peripheral device 2 to the computer host 1 at a higher data report rate, and a large amount of alternative data (e.g., the sensor data or the roller movement data) can be transmitted from the peripheral device 2 to the computer host 1 at a reduced data report rate. Consequently, when the computer host 1 is in a busy state, the workload of the computer host 1 can be reduced, and the power consumption of the peripheral device 2 will be saved.

In an embodiment, the data report rate adjustment rule is at least related to the data transmission strategy corresponding to the data type information in the peripheral device input information C2. For example, the key data has the highest priority to be transmitted from the peripheral device 2, each of the sensor data and the roller movement data has a lower priority to be transmitted from the peripheral device 2, and the light effect control data has the lowest priority to be transmitted from the peripheral device 2. It is noted that the data transmission strategies corresponding to different data types may be varied according to the practical requirements or dynamically adjusted. Consequently, the data report rate adjustment rule can be dynamically determined.

According to the above strategies about the transmission priorities, the concentrated simultaneous transmission of a large amount of data can be avoided. Due to the data offloading approach, the efficacy of reducing the data report rate can be effectively enhanced. Consequently, when the computer host 1 is in a busy state, the workload of the computer host 1 can be reduced.

In another embodiment, the data report rate adjustment rule is at least related to the data transmission strategy corresponding to the data type information in the peripheral device input information C2. Moreover, at least one of the sensor data, the roller movement data and the light effect control data is subjected to a specified removing and recombining process by the peripheral device 2. Consequently, the overall data amount is reduced. Then, the at least one of the sensor data, the roller movement data and the light effect control data with the reduced data amount is transmitted from the peripheral device 2 to the computer host 1.

During the specified removing and recombining process, at least one small-sized data in the at least one of the sensor data, the roller movement data and the light effect control data is removed, or at least one of two shortly-generated consecutive data in the at least one of the sensor data, the roller movement data and the light effect control data are removed, or plural small-sized data in the at least one of the sensor data, the roller movement data and the light effect control data are removed and the at least one of the sensor data, the roller movement data and the light effect control data are recombined.

Figure 4:
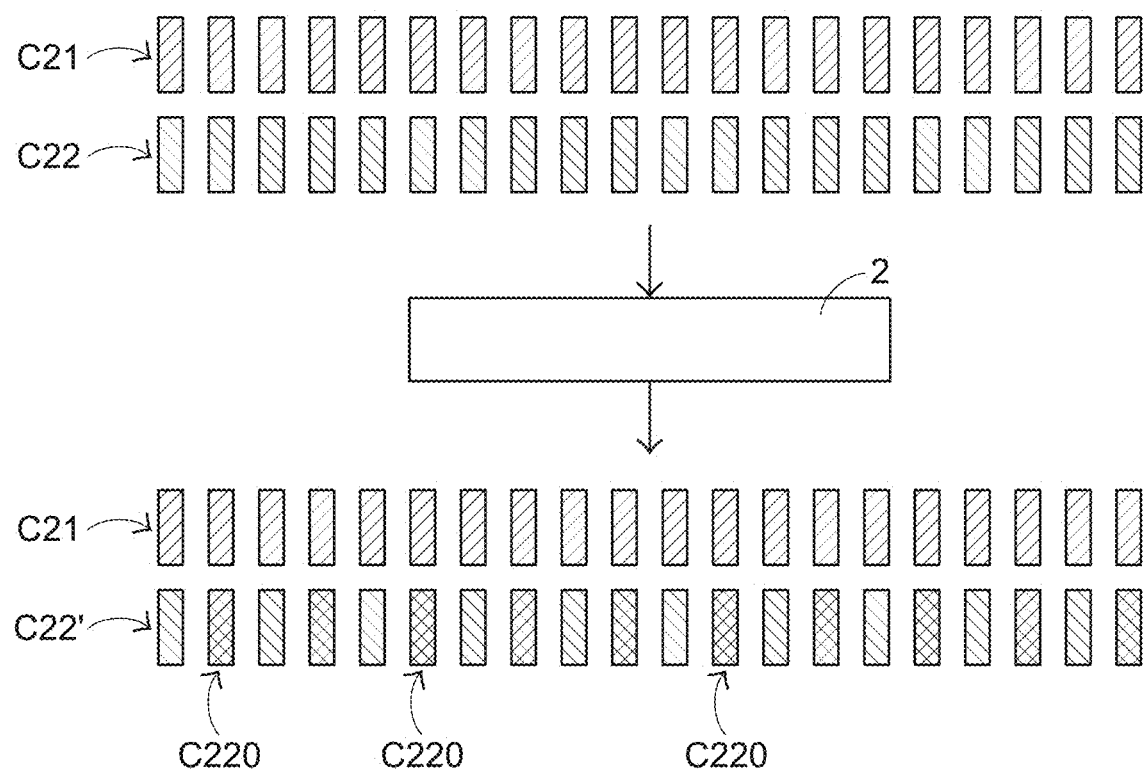
FIG. 4 schematically illustrates a data transmission strategy corresponding to the data amount information in the peripheral device input information according to the data report rate adjustment method of the first embodiment and the second embodiment.

An example of the specified removing and recombining process will be described with reference to FIG. 4. FIG. 4 schematically illustrates a data transmission strategy corresponding to the data amount information in the peripheral device input information according to the data report rate adjustment method of the first embodiment and the second embodiment. For example, the peripheral device is a mouse. The peripheral device input information C2 at least contains a key data information C21 and a sensor data information C22.

When the user operates the peripheral device 2 and plural key data and plural sensor data are generated and inputted into the peripheral device 2, the key data information C21 and the sensor data information C22 are respectively related to the amount of the plural key data and the amount of the plural sensor data. Generally, the key data are more important than the sensor data. Consequently, in the specified removing and recombining process, the contents of the key data corresponding to the key data information C21 are not changed. Since the sensor data are less important, the sensor data may contain many repetitive or small-sized data C220. In other words, the repetitive or small-sized data C220 can be selectively filtered out or removed. After the repetitive or small-sized data C220 are filtered out or removed, the sensor data information C22 is changed as a new sensor data information C22'. Since the amount of the sensor data corresponding to the sensor data information C22 is reduced, the sensor data can be transmitted from the peripheral device 2 to the computer host 1 at a reduced data report rate. Consequently, the workload of the computer host 1 can be reduced.

Moreover, the data report rate adjustment rule can be previously set. In an embodiment, the data report rate adjustment rule is previously set in one of the data report rate intelligent adjustment software and the computer host 1 and then provided to the peripheral device 2. In another embodiment, the data report rate adjustment rule is directly set in the firmware of the microprocessor and then provided to the peripheral device 2.

After the step S27, a step S28 is performed. In the step S28, the plural input data of the peripheral device 2 corresponding to the peripheral device input information C2 are integrated as a data package in a transmission format complying with the peripheral device 2. After the data package is temporarily stored in the peripheral device, the data package will be transmitted from the peripheral device 2 at a proper time. Then, the steps S211 and S212 are performed again.

As mentioned above, after the step S27 is completed, the peripheral device 2 realizes how to dynamically adjust the data report rate according to a data type information or a data amount information in the peripheral device input information C2 and/or dynamically adjust the data transmission strategy according to the data type information or the data amount information in the peripheral device input information C2 in the process of transmitting the peripheral device input information C2. In the step S28, the input data of the peripheral device 2 corresponding to the peripheral device input information C2 are integrated as the data package in a transmission format complying with the peripheral device 2. The data package is temporarily stored in the peripheral device. Consequently, the data package can be transmitted from the peripheral device 2 to the computer host 1 at a proper time.

From the above descriptions, the present invention provides an intelligent data report rate adjustment method. According to the actual workload level of the computer host and/or the amount of the input data of the peripheral device, the priority or the report rate of the data to be transmitted from the peripheral device can be dynamically adjusted or set. More especially, the unnecessary data report can be avoided. Consequently, the workload of the computer host can be effectively reduced, and the power consumption of the peripheral device can be saved. In other words, the technologies of the present invention are industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A data report rate adjustment method for use between a computer host and a peripheral device, the data report rate adjustment method at least comprising steps of:
    (a) acquiring a hardware operation information;
    (b) judging whether the hardware operation information reaches a monitoring threshold value;
    (c) if the hardware operation information does not reach the monitoring threshold value, maintaining a data report rate of the peripheral device, and performing the step (a) again; and
    (d) if the hardware operation information reaches the monitoring threshold value, issuing a data report rate change command to the peripheral device, wherein the peripheral device performs a data report rate adjustment and transmission process in response to the data report rate change command, and the step (a) is performed again,
    wherein during the data report rate adjustment and transmission process, the peripheral device dynamically changes the data report rate and/or dynamically determines a data transmission strategy according to the data report rate change command and a data report rate adjustment rule, wherein while input data corresponding to a peripheral device input information are transmitted from the peripheral device to the computer host, the data report rate is dynamically adjusted according to a data type information or a data amount information in the peripheral device input information and/or the data transmission strategy is dynamically determined according to the data type information or the data amount information in the peripheral device input information.

2. The data report rate adjustment method according to claim 1, wherein in the step (a), the hardware operation information contains at least one of a hardware real-time load information and the peripheral device input information.

3. The data report rate adjustment method according to claim 2, wherein the hardware real-time load information is related to a workload level of a central processing unit of the computer host in a real-time operation, and the peripheral device input information is related to a type or an amount of the input data to be transmitted from the peripheral device to the computer host.

4. The data report rate adjustment method according to claim 3, wherein in the step (b), the monitoring threshold value is a monitoring threshold value related to the workload level of the central processing unit of the computer host in the real-time operation, or the monitoring threshold value is a monitoring threshold value related to the type or the amount of the input data of the peripheral device.

5. The data report rate adjustment method according to claim 1, wherein in the step (d), the data type information in the peripheral device input information is related to at least one of a key data, a sensor data, a roller movement data and a light effect control data.

6. The data report rate adjustment method according to claim 5, wherein in the step (d), the data report rate adjustment rule is at least related to the data report rate corresponding to the data type information in the peripheral device input information, wherein the data report rate corresponding to the key data is higher than the data report rate of each of the sensor data and the roller movement data, or the data report rate of each of the sensor data and the roller movement data is higher than the data report rate corresponding to the light effect control data.

7. The data report rate adjustment method according to claim 5, wherein in the step (d), the data report rate adjustment rule is at least related to the data transmission strategy corresponding to the data type information in the peripheral device input information, wherein the key data has the highest priority to be transmitted from the peripheral device, each of the sensor data and the roller movement data has a lower priority to be transmitted from the peripheral device, and the light effect control data has the lowest priority to be transmitted from the peripheral device.

8. The data report rate adjustment method according to claim 5, wherein in the step (d), the data report rate adjustment rule is at least related to the data transmission strategy corresponding to the data amount information in the peripheral device input information, wherein at least one of the sensor data, the roller movement data and the light effect control data is subjected to a specified removing and recombining process so as to reduce an overall data amount, and then the at least one of the sensor data, the roller movement data and the light effect control data with the reduced data amount is transmitted from the peripheral device to the computer host.

9. The data report rate adjustment method according to claim 8, wherein during the specified removing and recombining process, at least one small-sized data in the at least one of the sensor data, the roller movement data and the light effect control data is removed, or at least one of two shortly-generated consecutive data in the at least one of the sensor data, the roller movement data and the light effect control data are removed, or plural small-sized data in the at least one of the sensor data, the roller movement data and the light effect control data are removed and the at least one of the sensor data, the roller movement data, and the light effect control data are recombined.

10. The data report rate adjustment method according to claim 1, wherein in the step (d), before the peripheral device input information is transmitted from the peripheral device to the computer host, the input data corresponding to the peripheral device input information are integrated as a data package in a transmission format complying with the peripheral device by the peripheral device, wherein after the data package is temporarily stored in the peripheral device, the data package is transmitted from the peripheral device to the computer host.

11. The data report rate adjustment method according to claim 1, wherein before the step (d), the data report rate adjustment method at least comprises steps of:
    (e) if the hardware operation information reaches the monitoring threshold value, judging whether the data report rate adjustment rule needs to be updated; and
    (f) if a judging result of the step (e) indicates that the data report rate adjustment rule needs to be updated, allowing the peripheral device to update the data report rate adjustment rule and performing the step (d) again.

12. The data report rate adjustment method according to claim 11, wherein a data report rate intelligent adjustment software is installed in the computer host, and the data report rate intelligent adjustment software works with the computer host and a microprocessor of the peripheral device to implement the step (a), the step (b), the step (c), the step (d), the step (e) and the step (f), wherein when the data report rate intelligent adjustment software is executed, an operation status or a system configuration status of the computer host and/or the peripheral device is detected and collected, so that the hardware operation information is acquired.

\* \* \* \* \*